Jan. 7, 1936.  R. F. TATROE  2,027,005
ROOT SPRAY
Filed Sept. 20, 1935
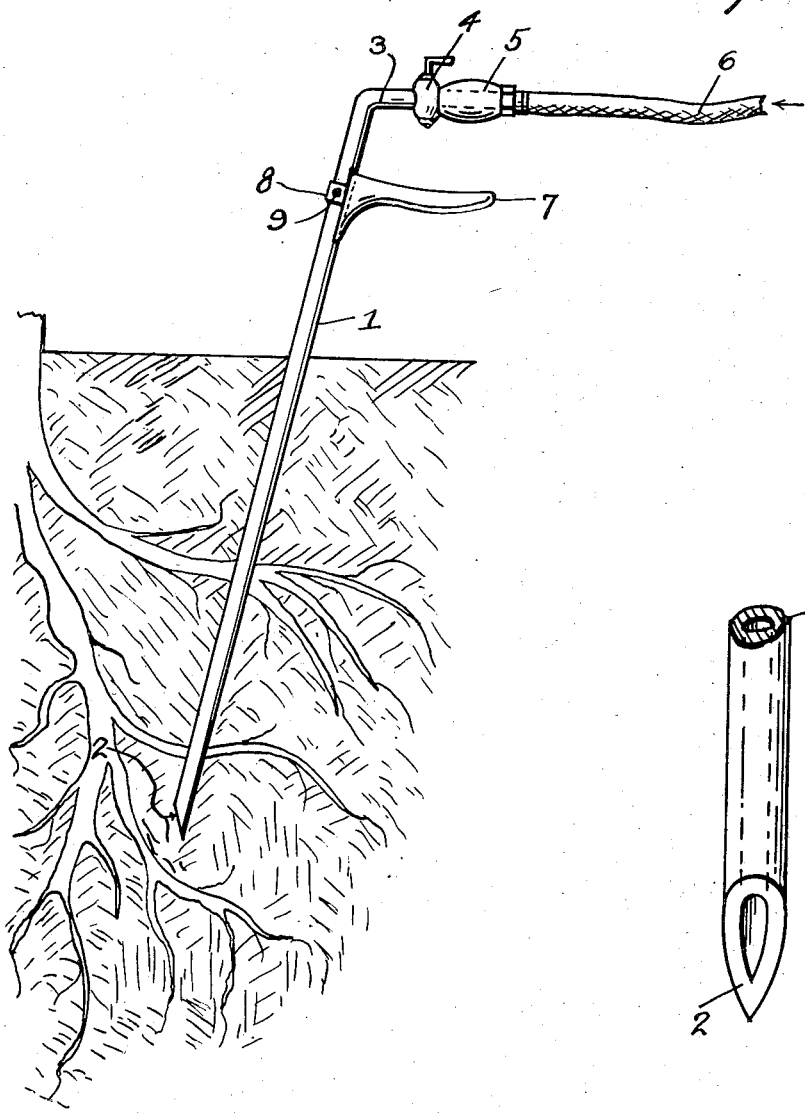
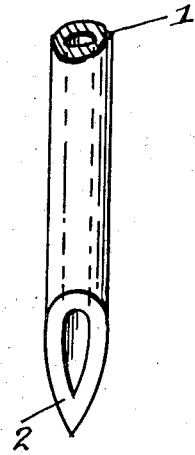
Inventor
R. F. Tatroe
By Clarence A. O'Brien
Attorney Patented Jan. 7, 1936

2,027,005

UNITED STATES PATENT OFFICE 2,027,005

ROOT SPRAY

Raymond F. Tatroe, Coffeyville, Kans.

Application September 20, 1935, Serial No. 41,463

2 Claims. (Cl. 47—49)

This invention relates to a root spray, the general object of the invention being to provide simple means to furnish water to the roots of trees, plants, bushes and the like so that water can be furnished without waste and where it does the most good.

This invention also consists in certain other features of construction and in the combination and arrangement of the several parts to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is an elevation partly in section showing how the device is used to supply water to the roots of a tree, plant or the like.

Figure 2 is a fragmentary elevation looking toward the beveled end of the water supply pipe.

In this drawing the numeral 1 indicates a pipe which is preferably of one fourth (¼) inch dimension with its lower end cut on a bevel to provide the point 2 at one side of the bore of the pipe and below the same so that the water escaping from the bore will flow sidewise and not straight down as it would if the water pass through a straight end of the pipe.

The upper end of the pipe is bent as shown at 3 and has a valve 4 attached thereto and a coupling 5 adapted to connect the pipe with a hose 6 leading to a source of supply. A pistol grip handle 7 is adjustably connected to the pipe through means of collar 8 having a nut and screw 9 therein so that the handle can be adjusted on the pipe.

In using the device the pointed end of the pipe is pressed into the ground and while this is being done the valve is opened so that the water flowing from the lower end of the pipe will facilitate the passage of the pipe through the ground. The water will flow to one side toward the roots as shown in Figure 1 and not straight down so that water will be supplied to the roots in such a manner that a minimum amount of water is used. The point or end piece should be of tempered steel and sharp enough to cut through weeds and the like and the flow of water through the pipe as it is being pressed into the ground will prevent dirt from clogging up the bore of the pipe. After the pipe is in proper position the flow of water can be cut down. The handle 7 can be adjusted to engage the ground with the lower end of the pipe in the desired position so that the handle will prevent the pipe from sliding downwardly farther into the ground as the water loosens the soil and the dirt. By making the pipe of small size as it is being pulled out of the hole the water will wash the bore of the hole and thus fill the hole as the pipe is being withdrawn.

It is thought from the foregoing description that the advantages and novel features of the invention will be readily apparent.

It is to be understood that changes may be made in the construction and in the combination and arrangement of the several parts provided that such changes fall within the scope of the appended claims.

What is claimed is:—

1. Means for supplying water to the roots of trees, plants and the like comprising a pipe having a beveled end which causes the water to flow from the bore of the pipe sidewise, means for connecting the upper end of the pipe to a source of supply, a valve for controlling the flow of water through the pipe and a handle on the upper portion of the pipe.

2. Means for supplying water to the roots of trees, plants and the like comprising a pipe having a beveled end which causes the water to flow from the bore of the pipe sidewise, means for connecting the upper end of the pipe to a source of supply, a valve for controlling the flow of water through the pipe and a handle on the upper portion of the pipe, said handle being adjustably connected with the pipe.

RAYMOND F. TATROE.